(12) United States Patent
Ohtaka

(10) Patent No.: US 7,573,248 B2
(45) Date of Patent: Aug. 11, 2009

(54) STEP-UP SWITCHING VOLTAGE REGULATOR CIRCUIT

(75) Inventor: Nobuyuki Ohtaka, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 573 days.

(21) Appl. No.: 11/212,243

(22) Filed: Aug. 26, 2005

(65) Prior Publication Data

US 2006/0043931 A1 Mar. 2, 2006

(30) Foreign Application Priority Data

Aug. 27, 2004 (JP) ............................. 2004-248011

(51) Int. Cl.
G05F 1/573 (2006.01)
G05F 1/00 (2006.01)

(52) U.S. Cl. ....................... 323/282; 323/284

(58) Field of Classification Search ................ 323/282, 323/284, 299; 362/249.02, 545, 800
See application file for complete search history.

(56) References Cited

U.S. PATENT DOCUMENTS

| | | | | |
|---|---|---|---|---|
| 4,097,793 | A * | 6/1978 | Shapiro et al. | 324/403 |
| 4,264,896 | A * | 4/1981 | Sakarya et al. | 398/15 |
| 4,629,970 | A * | 12/1986 | Johansson | 323/285 |
| 4,649,334 | A * | 3/1987 | Nakajima | 323/299 |
| 5,161,097 | A * | 11/1992 | Ikeda | 363/124 |
| 5,760,572 | A * | 6/1998 | Takeda et al. | 323/288 |
| 6,130,529 | A * | 10/2000 | Andres et al. | 323/303 |
| 2001/0002102 | A1 * | 5/2001 | Petricek et al. | 323/224 |

FOREIGN PATENT DOCUMENTS

JP 6189462 7/1994

OTHER PUBLICATIONS

English language abstract of Publication No. JP6189462 dated Jul. 8, 1994, esp@cenet database, 1 page.
Office Action dated Jun. 8, 2007, issued by the China Patent Office in corresponding Application No. 2005/10083637.2, 4 pages.

* cited by examiner

*Primary Examiner*—Akm E Ullah
*Assistant Examiner*—Arun Williams
(74) *Attorney, Agent, or Firm*—Osha • Liang LLP

(57) ABSTRACT

A power voltage of a battery (including a secondary battery) mounted on a portable device drops with use or the like of the portable device. Therefore, a step-up switching voltage regulator circuit is mounted on the portable device. On the other hand, the power voltage of the battery exceeds a voltage necessary for driving the portable device sometimes when the battery is fully charged. In this case, when the step-up switching voltage regulator circuit is driven, the power is consumed in vain, and a burden is imposed on the battery. The step-up switching voltage regulator circuit of the present embodiment switches an output in accordance with the power voltage, that is, raises the power voltage supplied from the battery to a predetermined output voltage, and outputs the output voltage, when the power voltage supplied from the battery is smaller than the predetermined output voltage; on the other hand, the step-up switching voltage regulator circuit outputs the power voltage supplied from the battery as the output voltage, when the power voltage supplied from the battery is larger than the predetermined output voltage; and consequently, in the step-up switching voltage regulator circuit, the burden on the battery mounted on the portable device can be reduced.

4 Claims, 10 Drawing Sheets

RERATED ART

RERATED ART

STEP-UP SWITCHING VOLTAGE REGULATOR CIRCUIT

CROSS-REFERENCE TO RELATED APPLICATION TO RELATED APPLICATION

The entire disclosure of Japanese Patent Application No. 2004-248011 including the specification, claims, drawings, and abstract is incorporated herein by reference.

BACKGROUND OF THE INVENTION

1. Field of the Invention

The present invention relates to a step-up switching voltage regulator circuit mounted on a portable device.

2. Description of the Related Art

Portable devices such as a cellular phone and a personal digital assistance (PDA) are driven by a power voltage supplied from a battery (including a secondary battery) mounted on the portable devices. The power voltage supplied from the battery drops with use of the portable device and the like. Therefore, a voltage step-up circuit for raising the dropped power voltage to a predetermined output voltage is mounted on the above-described portable device so that the portable device can be driven, even when the power voltage supplied from the battery drops. As one of such voltage step-up circuits, there is a step-up switching voltage regulator circuit.

FIG. 9 is a diagram showing a conventional step-up up switching voltage regulator circuit shown in FIG. 9 is a voltage step-up chopper circuit. The step-up switching voltage regulator circuit is provided with a reference voltage generation circuit 1, an error amplifier 3, a PWM (Pulse-Width Modulation) circuit 5, a driver circuit 7, a switching transistor 9a, a diode 9b, a coil 11, and a capacitor 13. Furthermore, this step-up switching voltage regulator circuit raises a power voltage Vi supplied from a battery to a predetermined output voltage Vo to output the voltage.

The reference voltage generation circuit 1 is a circuit which generates a reference voltage Vb for setting the predetermined output voltage Vo of the step-up switching voltage regulator circuit. An output section of the reference voltage generation circuit 1 is connected to one of input sections of the error amplifier 3. The error amplifier 3 is a circuit for comparing the reference voltage Vb with the predetermined output voltage Vo output from the step-up switching voltage regulator circuit to output an error signal based on a result of the comparison. An output section of the error amplifier 3 is connected to an input section of the PWM circuit 5. It is to be noted that the error signal increases with an increase of a difference between the reference voltage Vb and the output voltage Vo.

The PWM circuit 5 sets a duty ratio of a PWM signal based on the error signal output from the error amplifier 3 to output the duty ratio. The duty ratio of the PWM signal increases with an increase of a value of the error signal. Furthermore, an output section of the PWM circuit 5 is connected to an input section of the driver circuit 7. It is to be noted that if the PWM circuit 5 compares a triangular wave with the error signal, the PWM signal becomes a low level when the triangular wave is greater than the error signal.

The driver circuit 7 is an amplifying circuit which amplifies an amplitude of the PWM signal output from the PWM circuit 5 up to such an extent as to enable switching control of the switching transistor 9a described later. An output section of this driver circuit 7 is connected to a gate of the switching transistor 9a.

The switching transistor 9a is an n-channel type FET (Field-Effect Transistor) which turns on when the PWM signal output from the driver circuit 7 is applied to a gate and this PWM signal is at a high level. A drain of the switching transistor 9a is connected to the coil 11, and a source thereof is grounded. A quantity of a current flowing through the coil 11 is controlled in accordance with the switching control of the switching transistor 9a. One terminal of the coil 11 is connected to the battery, and the other terminal thereof is connected to an anode of the diode 9b and the drain of the switching transistor 9a.

The diode 9b prevents backflow of the current, when the capacitor 13 described later discharges. The anode of this diode 9b is connected to the coil 11, and a cathode thereof is connected to one terminal of the capacitor 13. The capacitor 13 holds a voltage of the diode 9b on a cathode side. One terminal of the capacitor 13 is grounded, and the other terminal thereof is connected to an output terminal of the step-up switching voltage regulator circuit, whereby the output voltage Vo is output from this output terminal. This output voltage Vo is fed back to one of input terminals of the above error amplifier 3.

According to the above-described constitution, the conventional step-up switching voltage regulator circuit shown in FIG. 9 raises the power voltage Vi supplied from the battery to the predetermined output voltage Vo, and then outputs the raised voltage. Next, an operation of the conventional step-up switching voltage regulator circuit will be described.

The reference voltage Vb generated in the reference voltage generation circuit 1 is input into one input terminal of the error amplifier 3. On the other hand, the output voltage Vo is input into the other input terminal of the error amplifier 3.

Here, the output voltage Vo is a voltage (Vo=Vi−Vf) obtained by subtracting a forward-direction voltage Vf of the diode 9b from the power voltage Vi. The error amplifier 3 compares two input voltage values, and outputs the error signal in accordance with the difference between the output voltage Vo and the reference voltage Vb. It is to be noted that the error signal increases with the increase of the difference between the reference voltage Vb and the output voltage Vo, as described above.

Next, the PWM circuit 5 sets the duty ratio of the output PWM signal in accordance with the error signal output from the error amplifier 3, and outputs the PWM signal whose duty ratio has been set. Here, as described above, the duty ratio of the PWM signal is output at a large value (a time of the high level lengthens), as the value of the error signal is large. It is to be noted that if the PWM circuit 5 compares the triangular wave with the error signal and when the triangular wave is greater than the error signal, the PWM signal becomes the low level.

The PWM signal output from the PWM circuit 5 is input into the driver circuit 7, and is amplified to such an extent that the switching control of the switching transistor 9a is possible. The PWM signal amplified by the driver circuit 7 is applied to the gate of the switching transistor 9a to subject the switching transistor 9a to switching control. This switching control will be described hereinafter in detail.

When the PWM signal output from the PWM circuit 5 and amplified by the driver circuit 7 is at the high level, the switching transistor 9a turns on. At this time, the current flows through the coil 11. Next, when the PWM signal output from the PWM circuit 5 and amplified by the driver circuit 7 becomes the low level, the switching transistor 9a turns off. At this time, a coil voltage V1 is generated in the coil 11 in accordance with a change of the quantity of the flowing current. Accordingly, the output voltage Vo becomes a voltage (Vo=Vi+V1) obtained by adding the power voltage Vi to the coil voltage V1 generated in the coil 11. With this voltage Vo, the capacitor 13 is charged via the diode 9b. In this manner, the power voltage Vi is raised by the switching control of the switching transistor 9a, and the raised voltage Vo is output as the output voltage.

As understood from the above, the step-up switching voltage regulator circuit raises the power voltage, as the power voltage supplied from the battery drops. Therefore, the step-up switching voltage regulator circuit can output the predetermined output voltage, even if the power voltage supplied from the battery drops.

On the other hand, the power voltage of the battery mounted on the above-described portable device exceeds a voltage necessary to drive the portable device sometimes. For example, in a 3V-specified Li (Lithium) ion battery mounted on the cellular phone or the like, a power voltage of 4 V or more is obtained when the battery is fully charged. However, the output voltage necessary to operate the portable device is 4 V or less (e.g., a voltage of about +3.3 V is sufficient for driving an IC (Integrated Circuit)).

Therefore, when the step-up switching voltage regulator circuit is driven in a case where the power voltage supplied from the battery is such a voltage as to enable the driving of the portable device, the power is consumed in vain, and exhaustion of the battery is accelerated. Even if the power voltage Vi is output without the rise of the voltage, a burden on the battery mounted on the portable device increases as much as a drop of the forward-direction voltage Vf of the diode. FIG. 10 is a diagram showing a behavior of a consumed current i of the battery which increases owing to the drop of the power voltage Vi. As shown in FIG. 10, the predetermined output voltage Vo unnecessarily rises as much as the drop due to the forward-direction voltage Vf of the diode 9b, so that the current i of the battery is inconveniently consumed, and the burden on the battery increases.

An object of the present invention is to realize a step-up switching voltage regulator circuit which reduces a burden on a battery mounted on a portable device.

SUMMARY OF THE INVENTION

A step-up switching voltage regulator circuit of the present invention switches an output in accordance with a power voltage. That is, when the power voltage supplied from a battery is smaller than a predetermined output voltage, the step-up switching voltage regulator circuit of the present invention raises the power voltage supplied from the battery to the predetermined output voltage to output the output voltage. On the other hand, in the present invention, when the power voltage supplied from the battery is larger than the predetermined output voltage, the step-up switching voltage regulator circuit outputs the power voltage supplied from the battery as the output voltage. Consequently, in the step-up switching voltage regulator circuit of the present invention, a burden on the battery mounted on a portable device can be reduced.

BRIEF DESCRIPTION OF THE DRAWINGS

The above and other objects, advantages, and features of the present invention will become more apparent from the following description taken in conjunction with the accompanying drawings in which.

DESCRIPTION OF THE PREFERRED EMBODIMENTS

Figure 1:
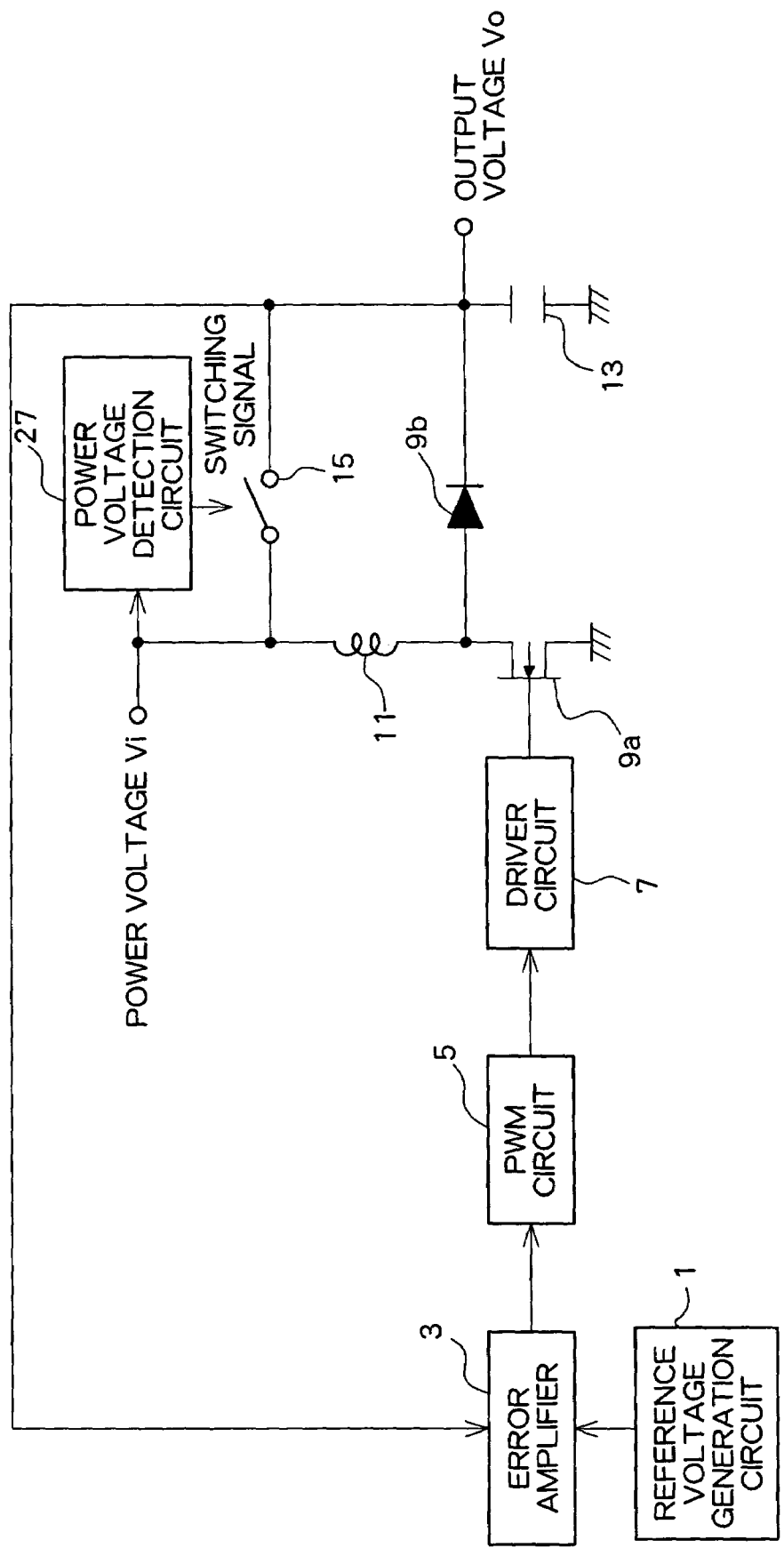
FIG. 1 is a diagram showing a step-up switching voltage regulator circuit according to a first embodiment of the present invention.

Best modes for carrying out the present invention will be described hereinafter with reference to the drawings. Here, it is assumed that a step-up switching voltage regulator circuit of the present embodiment is mounted on a portable device such as a cellular phone or a PDA (Personal Digital Assistance). It is also assumed that the step-up switching voltage regulator circuit of the present embodiment raises a power voltage supplied from a battery mounted on the portable device, and supplies the raised voltage as an output voltage to a member (e.g., light emitting diode, etc.) mounted on the portable device. It is to be noted that members similar or corresponding to those of a conventional example are denoted with the same reference numerals. The step-up switching voltage regulator circuit according to first to fourth embodiments will be described hereinafter with reference to the drawings.

DETAILED DESCRIPTION OF THE PREFERRED EMBODIMENTS

Best modes of carrying out the present invention will be described in further detail using various embodiments with reference to the accompanying drawings.

First Embodiment

FIG. 1 is a diagram showing a step-up switching voltage regulator circuit according to a first embodiment. The step-up switching voltage regulator circuit shown in FIG. 1 is provided with a reference voltage generation circuit 1, an error amplifier 3, a PWM circuit 5, a driver circuit 7, a switching transistor 9a, a diode 9b, a coil 11, and a capacitor 13. Furthermore, the circuit is provided with a switch 15 and a power voltage detection circuit 27.

The switch 15 is turned on/off based on a switching signal output from the power voltage detection circuit 27 described later. One terminal of this switch 15 is connected to a battery mounted on a portable device, the other terminal thereof is connected to an output terminal of the step-up switching voltage regulator circuit, and a switching terminal thereof is connected to an output section of the power voltage detection circuit 27 described later.

The power voltage detection circuit 27 detects a power voltage Vi supplied from the battery mounted on the above-described portable device. Moreover, the power voltage detection circuit 27 judges whether or not the detected power voltage Vi is greater than a predetermined output voltage Vo. Furthermore, the power voltage detection circuit 27 outputs a switching signal based on the judgment result. An input section of the power voltage detection circuit 27 is connected to the battery mounted on the portable device, and an output section thereof is connected to a switching terminal of the switch 15.

That is, according to the first embodiment, the step-up switching voltage regulator circuit detects the power voltage Vi supplied from the battery, and controls an on/off state of the switch 15 based on the detected power voltage Vi.

The power voltage Vi supplied from the battery mounted on the portable device is detected by the power voltage detection circuit 27.

The power voltage detection circuit 27 turns on the switch 15 by the switching signal, when the power voltage Vi detected by the power voltage detection circuit 27 is not less than the predetermined output voltage Vo. When the power voltage Vi is not less than the predetermined output voltage Vo, the power voltage detection circuit 27 stops power supply so that the reference voltage generation circuit 1, the error amplifier 3, the PWM circuit 5, and the driver circuit 7 are not driven. Therefore, the power voltage Vi supplied from the battery mounted on the portable device is not raised, and the voltage (power voltage Vi) is output as such from the output terminal of the step-up switching voltage regulator circuit.

Consequently, in the step-up switching voltage regulator circuit according to the first embodiment, when the power voltage Vi supplied from the battery is such a voltage (not less than the predetermined output voltage Vo) that the portable device can be driven, unlike the conventional step-up switching voltage regulator circuit, it is possible to reduce unnecessary consumption of power by the driving of the step-up switching voltage regulator circuit. Since a loss because of the drop by the forward-direction voltage Vf in the diode 9b is not generated, the battery can be effectively utilized.

Moreover, when the detected power voltage Vi is not less than the predetermined output voltage Vo, the power voltage detection circuit 27 turns off the switch 15 in response to the switching signal, and supplies the power so that the reference voltage generation circuit 1, the error amplifier 3, the PWM circuit 5, and the driver circuit 7 can be driven. Thus, the switch 15 turns off, and the reference voltage generation circuit 1, the error amplifier 3, the PWM circuit 5, and the driver circuit 7 are driven. Therefore, the step-up switching voltage regulator circuit can raise the power voltage Vi supplied from the battery mounted on the portable device, and output the predetermined output voltage Vo in the same manner as in the conventional step-up switching voltage regulator circuit.

Figure 2:
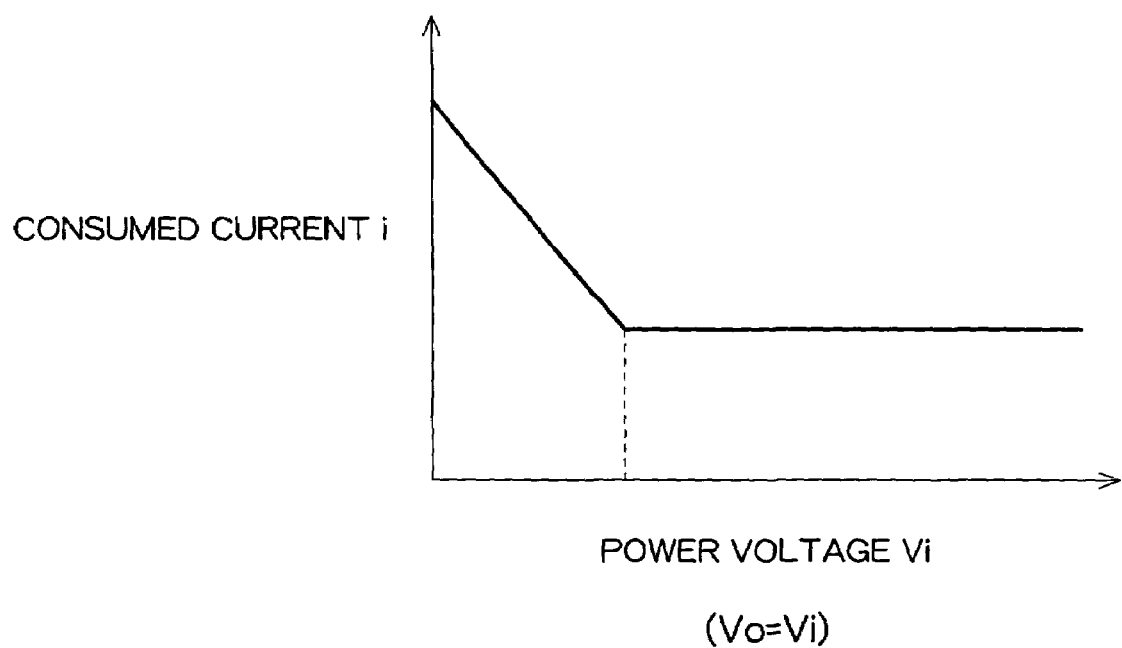
FIG. 2 is a diagram showing a relation between a power voltage and a charged voltage of the step-up switching voltage regulator circuit according to the first embodiment of the present invention.

FIG. 2 is a diagram showing that a consumed current i of the battery increases by a drop of the power voltage Vi. As shown in FIG. 2, in the present embodiment, the step-up switching voltage regulator circuit does not generate any loss because of the drop by the forward-direction voltage Vf in the diode 9b. Therefore, in the present embodiment, the step-up switching voltage regulator circuit can output a lower output voltage without raising the power voltage Vi. Therefore, the consumed current i of the battery can be reduced.

As described above, in the first embodiment, the step-up switching voltage regulator circuit is constituted to switch the output in accordance with the power voltage Vi. Consequently, it is possible to realize the step-up switching voltage regulator circuit which reduces a burden on the battery.

It is to be noted that in the first embodiment, the chopper type step-up switching voltage regulator circuit has been described, but similar effects are obtained even in a synchronous rectifier type step-up switching voltage regulator circuit using a switching transistor instead of the diode 9b.

Figure 3:
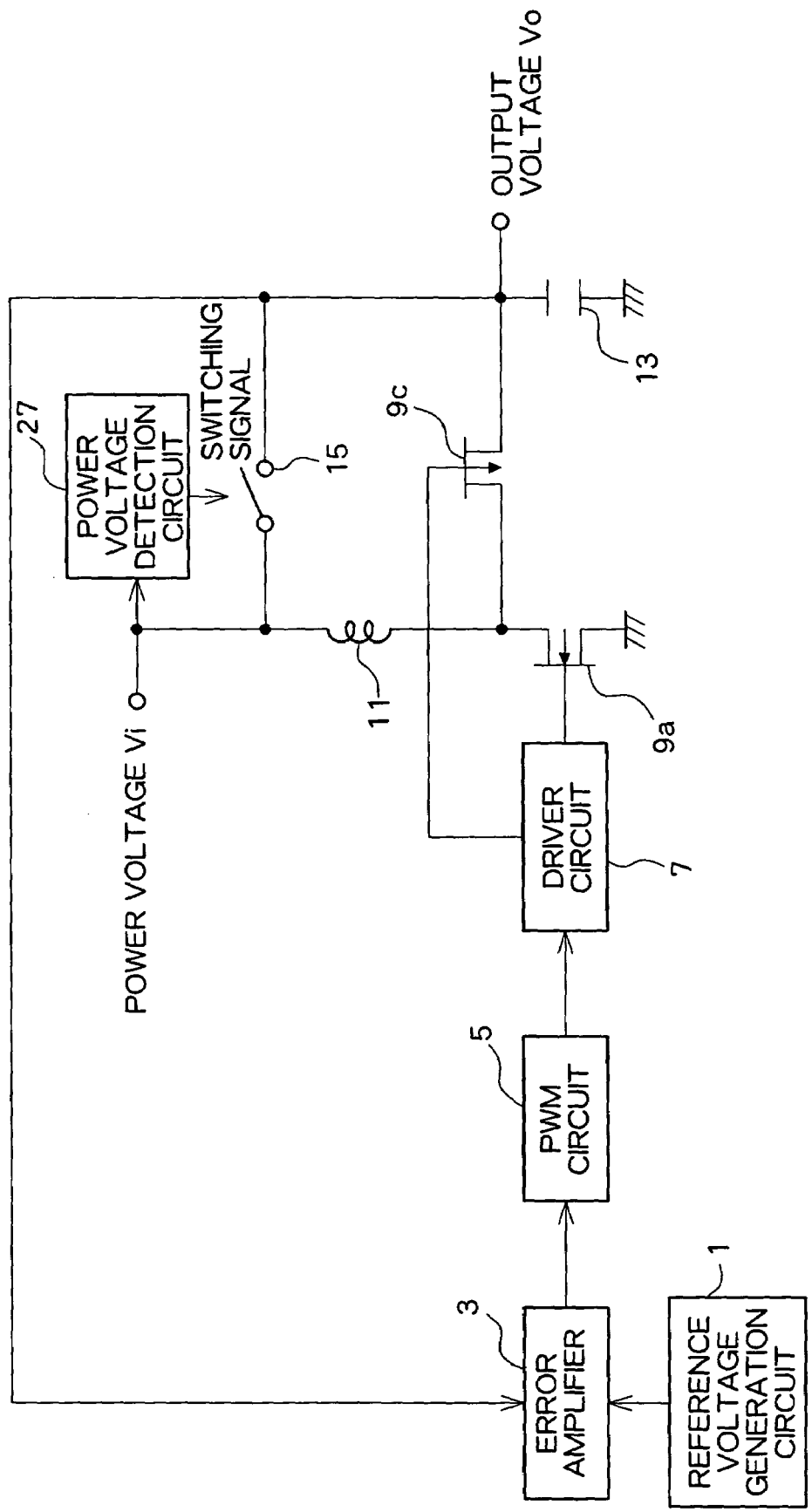
FIG. 3 is a diagram showing the step-up switching voltage regulator circuit according to the first embodiment of the present invention.

FIG. 3 is a diagram showing the synchronous rectifier type step-up switching voltage regulator circuit. In FIG. 3, a switching transistor 9c is a p-channel switching FET (Field-Effect Transistor) in which a PWM (Pulse-Width Modulation) signal output from a driver circuit 7 is applied to a gate of the switching transistor 9c and which turns on, when the PWM signal has a low level.

The gate of the switching transistor 9c is connected to an output section of the driver circuit 7, a drain thereof is connected to a coil 11 and a drain of a switching transistor 9a, and a source thereof is connected to one terminal of a capacitor 13. That is, the switching transistor 9c functions as a switch which turns off, when the switching transistor 9a is on, and which turns on, when the switching transistor 9a is off. It is to be noted that the charging/discharging with respect to the coil 11 and the capacitor 13 is similar to that in the chopper type step-up switching voltage regulator circuit. Therefore, the similar effects are obtained even in the synchronous rectifier type step-up switching voltage regulator circuit in which the switching transistor 9c is disposed instead of the diode 9b.

Second Embodiment

A step-up switching voltage regulator circuit raises a power voltage Vi supplied from a battery mounted on a portable device to a predetermined output voltage Vo, and drives a semiconductor component such as a light emitting diode mounted on the portable device. At this time, the step-up switching voltage regulator circuit is influenced by temperature characteristics or fluctuations of the light emitting diode, an output is not appropriately switched, and the battery is wasted unnecessarily. This respect will be described hereinafter.

The light emitting diode mounted on the portable device emits light, when a predetermined output voltage Vo is applied to an anode, and a forward-direction current (e.g., 1 mA to 20 mA) is passed by a constant-current circuit. A forward-direction voltage of the light emitting diode is determined by the forward-direction current basically set by the constant-current circuit. However, the forward-direction voltage of the light emitting diode fluctuates with each light emitting diode with regard to the temperature characteristics and the like, and differs with the light emitting diode. The voltage Vo applied to the light emitting diode has to be not less than the forward-direction voltage of the light emitting diode. Therefore, a reference voltage Vb by which it is judged whether or not the detected power voltage Vi is greater than the predetermined output voltage Vo has to be set assuming a case where the forward-direction voltage of the light emitting diode fluctuates most (is largest). That is, the reference voltage Vb has to be set to be high beforehand.

As one example, a cathode voltage of the light emitting diode fluctuates in a range of about 0.15 V to 0.4 V in a case where the diode is operated at 1 mA to 20 mA as described above, and the temperature characteristics also fluctuate in accordance with a current quantity. Therefore, the step-up switching voltage regulator circuit can apply a required forward-direction voltage to the light emitting diode by the power voltage Vi in a case where the forward-direction voltage of the light emitting diode does not fluctuate very much. However, as described above, the switch is turned off, the power voltage Vi is raised to be not less than the required forward-direction voltage, and an additional burden is imposed on the battery mounted on the portable device.

To solve the problem, in the second embodiment, when the light emitting diode is driven by the output voltage of the step-up switching voltage regulator circuit, the power voltage is detected by a cathode via the light emitting diode, not by the anode of the light emitting diode. An on/off state of a switch is changed based on a detected cathode voltage. The step-up switching voltage regulator circuit according to the second embodiment will be described hereinafter in detail.

Figure 4:
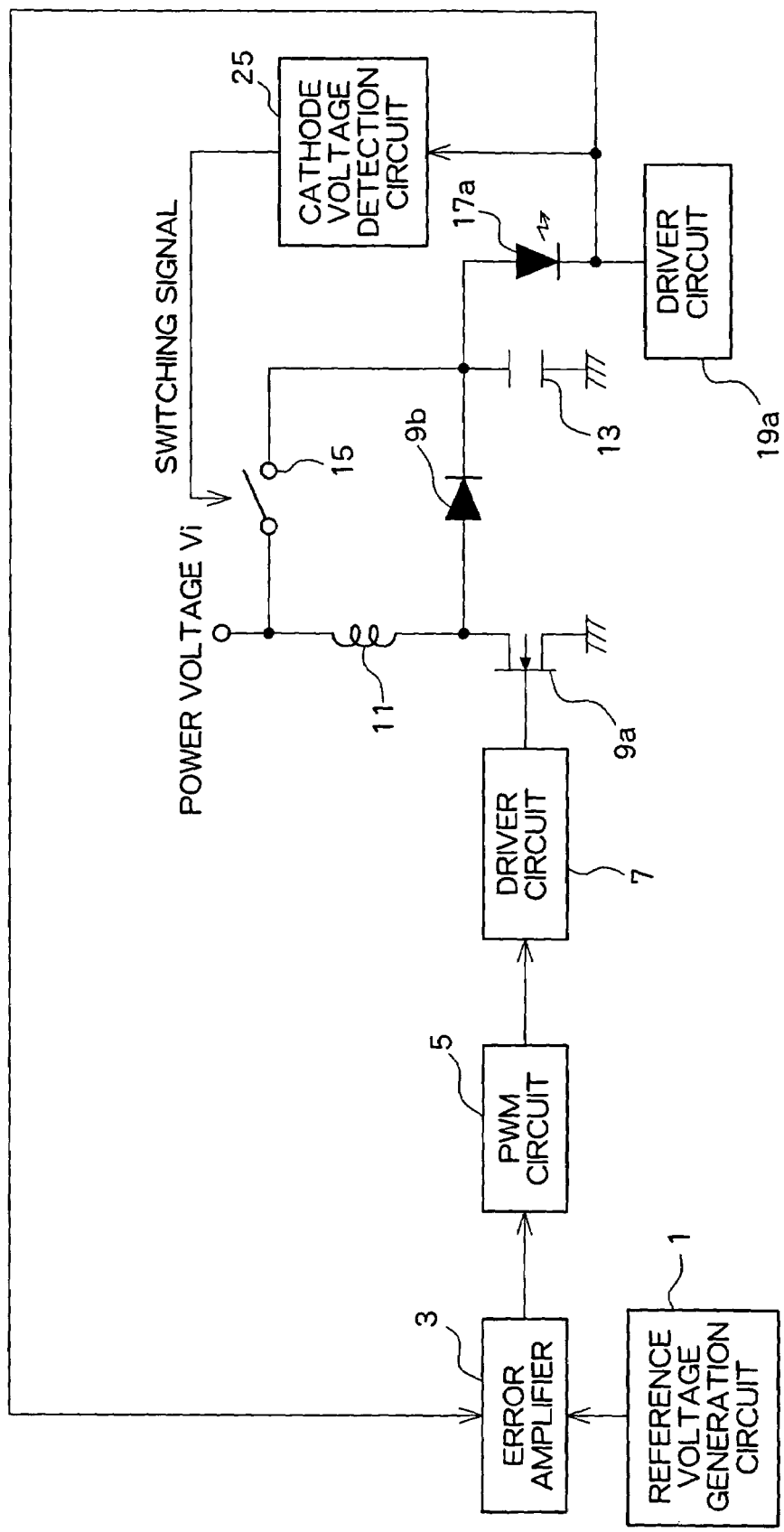
FIG. 4 is a diagram showing the step-up switching voltage regulator circuit according to a second embodiment of the present invention.

FIG. 4 is a diagram showing the step-up switching voltage regulator circuit according to the second embodiment. In FIG. 4, the step-up switching voltage regulator circuit is provided with a reference voltage generation circuit 1, an error amplifier 3, a PWM circuit 5, a driver circuit 7, a switching transistor 9a, a diode 9b, a coil 11, and a capacitor 13. Furthermore, the circuit is provided with a light emitting diode 17a, a driver circuit 19a, and a cathode voltage detection circuit 25.

Here, the light emitting diode 17a is the above-described light emitting diode mounted on the portable device. An anode of this light emitting diode 17a is connected to one terminal of the capacitor 13, and a cathode thereof is connected to an output section of the driver circuit 19a described later, an input section of the cathode voltage detection circuit 25, and one input section of the error amplifier 3. The driver circuit 19a is a constant-current circuit which adjusts a quantity of a current passed through the light emitting diode 17a. The driver circuit 19a is connected to a cathode of the light emitting diode 17a. Furthermore, the cathode voltage detection circuit 25 detects a cathode voltage of the light emitting diode 17a, judges whether or not the detected cathode voltage is greater than a predetermined cathode voltage, and outputs a switching signal to control an on/off state of a switch 15 based on the judgment result. The input section of the cathode voltage detection circuit 25 is connected to the cathode of the light emitting diode 17a, and an output section thereof is connected to a switching input section of the switch 15. Next, an operation will be described. It is to be noted that the switch 15 is brought into the on-state.

A power voltage Vi supplied from the battery mounted on the portable device is applied as an output voltage Vo to the anode of the light emitting diode 17a via the switch 15. On the other hand, the driver circuit 19a sets a forward-direction current of the light emitting diode 17a. Moreover, a forward-direction voltage determined by setting the forward-direction current is applied to the light emitting diode 17a. Therefore, a voltage obtained by subtracting the forward-direction voltage from the output voltage Vo applied to the anode is applied to the cathode of the light emitting diode 17a.

The cathode voltage detection circuit 25 detects a cathode voltage of the light emitting diode 17a. Moreover, the cathode voltage detection circuit 25 judges whether or not the detected cathode voltage of the light emitting diode 17a is greater than a predetermined cathode voltage. When the detected cathode voltage is not less than the predetermined cathode voltage, the switching signal is output so that the switch 15 continues to be on. Accordingly, the power voltage Vi supplied from the battery mounted on the portable device is not raised, and the voltage (power voltage Vi) is output as such from an output terminal of the step-up switching voltage regulator circuit.

When the power voltage Vi supplied from the battery mounted on the portable device drops, the cathode voltage of the light emitting diode 17a drops with the drop of the power voltage Vi supplied from the battery, while a potential difference of the above-described forward-direction voltage Vf is kept. Moreover, when the detected cathode voltage of the light emitting diode 17a is not less than a predetermined cathode voltage, the cathode voltage detection circuit 25 outputs the switching signal in such a manner as to turn off the switch 15. The power voltage Vi is raised by the step-up switching voltage regulator circuit, and applied to the anode of the light emitting diode 17a. The cathode voltage of the light emitting diode 17a is fed back to the error amplifier 3, and the cathode voltage of the light emitting diode 17a is kept at a certain value.

Figure 5:
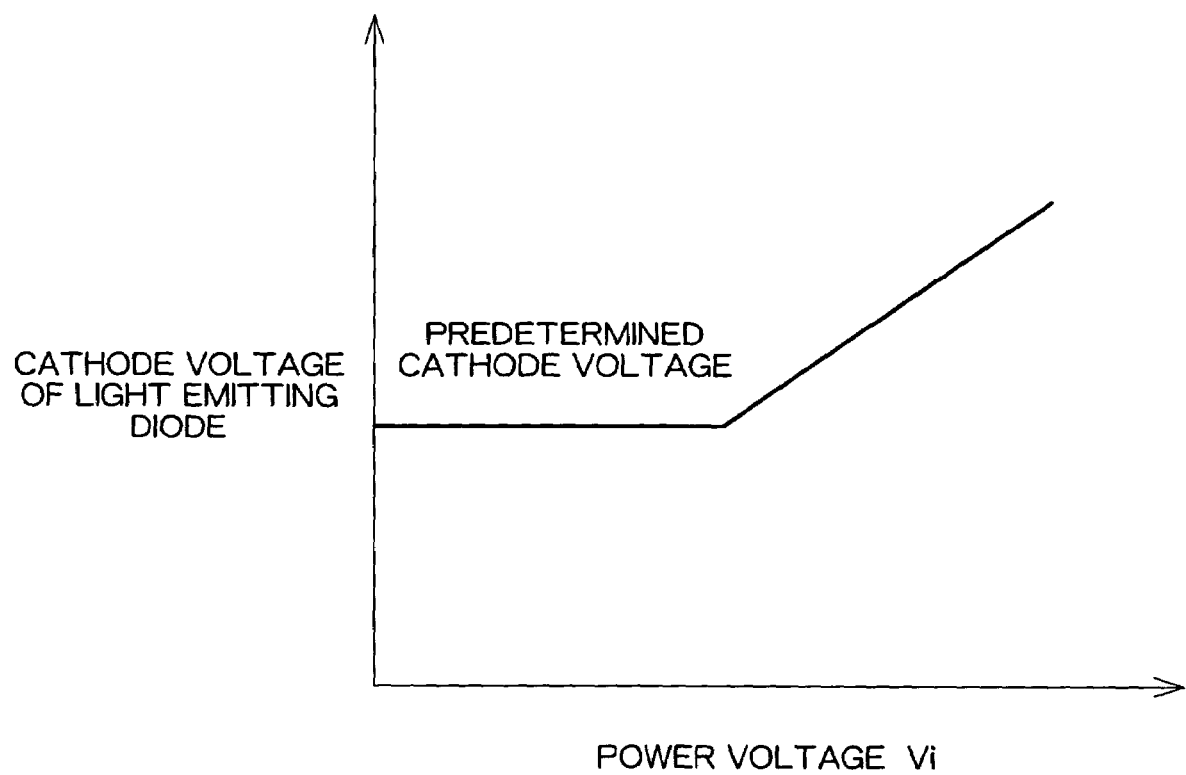
FIG. 5 is a diagram showing a relation between the power voltage and a cathode voltage of a light emitting diode in the step-up switching voltage regulator circuit according to the second embodiment of the present invention.

The power voltage Vi and the cathode voltage of the light emitting diode 17a are shown in FIG. 5. As shown in FIG. 5, the cathode voltage of the light emitting diode 17a drops in accordance with the drop of the power voltage Vi. Moreover, when the cathode voltage is not less than a predetermined cathode voltage, the step-up switching voltage regulator circuit turns off the switch 15 to start raising the power voltage Vi. Here, the forward-direction current flowing through the light emitting diode 17a is set to be constant by the driver circuit 19a. Therefore, even when the forward-direction voltage fluctuates because of temperature characteristics or fluctuations of the light emitting diode 17a, the PWM circuit 5 can apply the anode voltage of the light emitting diode 17a in accordance with the fluctuation of the forward-direction voltage so that the cathode voltage of the light emitting diode 17a is constant. Consequently, the step-up switching voltage regulator circuit can drive the light emitting diode 17a without unnecessarily raising the power voltage Vi, and can reduce the burden on the battery.

Moreover, as described above, the cathode voltage of the light emitting diode 17a is fed back in such a manner as to be a certain voltage. On the other hand, the forward-direction current flowing through the light emitting diode 17a is controlled by the driver circuit 19a. The driver circuit 19a is constituted of a current source such as a current mirror circuit. In the driver circuit 19a, a terminal voltage (necessary voltage) necessary for driving fluctuates in accordance with the forward-direction current flowing through the light emitting diode 17a.

That is, the terminal voltage (necessary voltage) necessary for driving the driver circuit 19a drops, when the forward-direction current of the light emitting diode 17a is small (a current quantity of the driver circuit 19a is small). The voltage increases, when the forward-direction current of the light emitting diode 17a is large (the current quantity of the driver circuit 19a is large).

As described above, even when the necessary voltage of the driver circuit 19a fluctuates in accordance with the current quantity, the predetermined cathode voltage of the cathode voltage detection circuit 25 for controlling the on/off state of the switch 15 is fixed to a certain value. In this case, the power voltage Vi is unnecessarily raised, and the burden is imposed on the battery.

Figure 6:
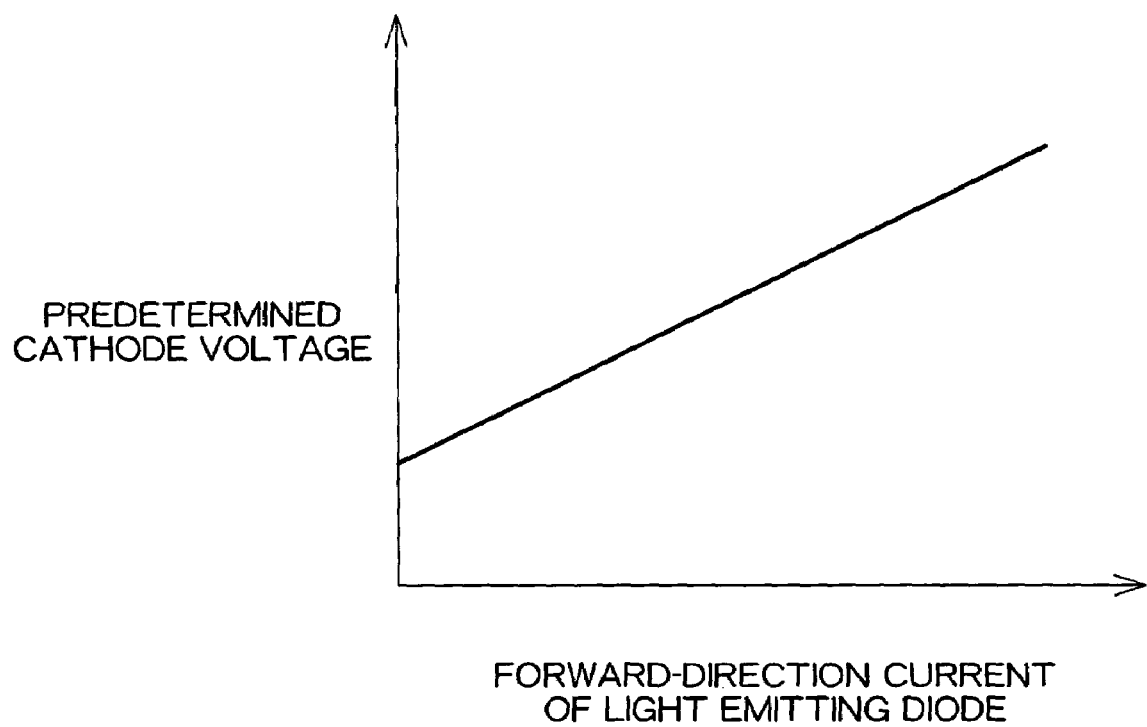
FIG. 6 is a diagram showing a relation between a cathode current of the light emitting diode and a predetermined cathode voltage of the light emitting diode in the step-up switching voltage regulator circuit according to the second embodiment of the present invention.

Therefore, as shown in FIG. 6, when the value of the predetermined cathode voltage to switch the output is changed in accordance with the forward-direction current flowing through the light emitting diode 17a, the burden on the battery can further be reduced in the step-up switching voltage regulator circuit according to the present embodiment.

As described above, the second embodiment is constituted to drive the light emitting diode by the output voltage and switch the output based on the cathode voltage of the light emitting diode 17a, 17b, and 17c. Consequently, the step-up switching voltage regulator circuit can be realized in which the output is switched irrespective of the temperature characteristics of the light emitting diode 17a, 17b, and 17c, and consumption of the current is suppressed. In the present embodiment, the chopper type step-up switching voltage regulator circuit has been described, but, needless to say, similar effects are obtained even from the synchronous rectifier type as in the first embodiment.

Third Embodiment

When a plurality of light emitting diodes described above are mounted on a portable device, characteristics of the respective light emitting diodes differ, and an on/off state of a switch has to be controlled in accordance with the characteristics as described above. When the plurality of light emitting diodes having different characteristics are mounted, the on/off state of the switch is controlled based on the lowest cathode voltage among cathode voltages of the plurality of light emitting diodes, and then a step-up switching voltage regulator circuit can supply a voltage necessary for driving each light emitting diode without unnecessarily raising the voltage. A step-up switching voltage regulator circuit according to a third embodiment will be described hereinafter in detail.

Figure 7:
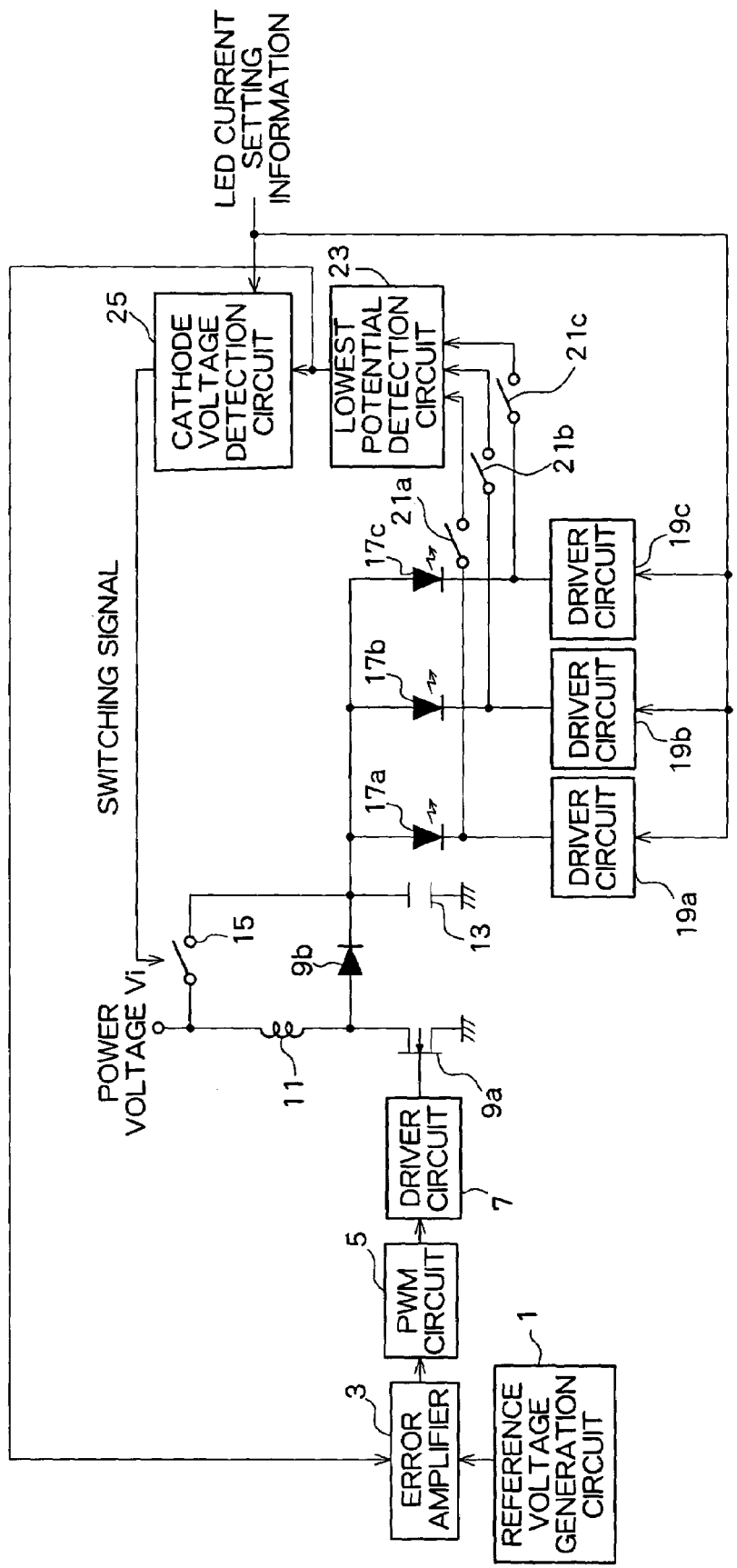
FIG. 7 is a diagram showing the step-up switching voltage regulator circuit according to a third embodiment of the present invention.

FIG. 7 shows the step-up switching voltage regulator circuit according to the third embodiment. In FIG. 7, the step-up switching voltage regulator circuit is provided with a reference voltage generation circuit 1, an error amplifier 3, a PWM circuit 5, a driver circuit 7, a switching transistor 9a, a diode 9b, a coil 11, and a capacitor 13. Furthermore, the circuit is provided with light emitting diodes 17a, 17b, 17c, driver circuits 19a, 19b, 19c, switches 21a, 21b, 21c, a lowest voltage detection circuit 23, and a cathode voltage detection circuit 25.

The light emitting diodes 17a, 17b, 17c have three primary colors of red (R), green (G), and blue (B), and are mounted on the portable device. Anodes of the light emitting diodes 17a, 17b, 17c are connected to one terminal of the capacitor 13, and cathodes thereof are connected to the driver circuits 19a, 19b, 19c. The driver circuits 19a, 19b, 19c are current control circuits which control currents flowing through the light emitting diodes 17a, 17b, 17c, respectively, and output sections of the circuits are connected to the cathodes of the light emitting diodes 17a, 17b, 17c. Each of the switches 21a, 21b, 21c connects each of the light emitting diodes 17a, 17b, 17c to the lowest voltage detection circuit 23. The lowest voltage detection circuit 23 is a voltage detection circuit which detects the lowest voltage among cathode voltages of each of the light emitting diodes 17a, 17b, 17c to output the detected cathode voltage. An input section of the lowest voltage detection circuit 23 is connected to the switches 21a, 21b, 21c, and an output section thereof is connected to the cathode voltage detection circuit 25. Next, an operation will be described.

The lowest voltage detection circuit 23 successively switches the switches 21a, 21b, 21c, and detects the cathode voltage of each of the light emitting diodes 17a, 17b, 17c. Moreover, the lowest voltage detection circuit 23 outputs the lowest cathode voltage among the detected cathode voltages. The output cathode voltage is input into the error amplifier 3 and the cathode voltage detection circuit 25. The cathode voltage detection circuit 25 switches an on/off state of a switch 15 based on the input cathode voltage.

Here, an equal voltage is applied to the anode of each of the light emitting diodes 17a, 17b, 17c. The switch 15 is switched based on the lowest cathode voltage among the cathode voltages of the light emitting diodes 17a, 17b, 17c. Therefore, a forward-direction voltage necessary for driving each diode can be applied to the light emitting diodes 17a, 17b, 17c. A forward-direction voltage necessary for the driver circuits 19a, 19b, 19c to pass forward-direction currents is applied to the light emitting diode having a high cathode voltage. Accordingly, the cathode voltage is applied to the light emitting diode having a high cathode voltage in accordance with this forward-direction voltage. Therefore, a power voltage Vi is not unnecessarily raised, the voltage necessary for driving all the light emitting diodes can be output, and burden on the battery can be reduced.

As described above, according to the third embodiment, the step-up switching voltage regulator circuit is constituted to detect the lowest cathode voltage in the plurality of light emitting diodes 17a, 17b, and 17c. Consequently, it is possible to realize the step-up switching voltage regulator circuit having a satisfactory efficiency, which applies the voltage necessary for driving the plurality of light emitting diodes without unnecessarily raising the voltage. In the present embodiment, the chopper type step-up switching voltage regulator circuit has been described, but, needless to say, similar effects are obtained even from the synchronous rectifier type as in the first embodiment.

Fourth Embodiment

Figure 8:
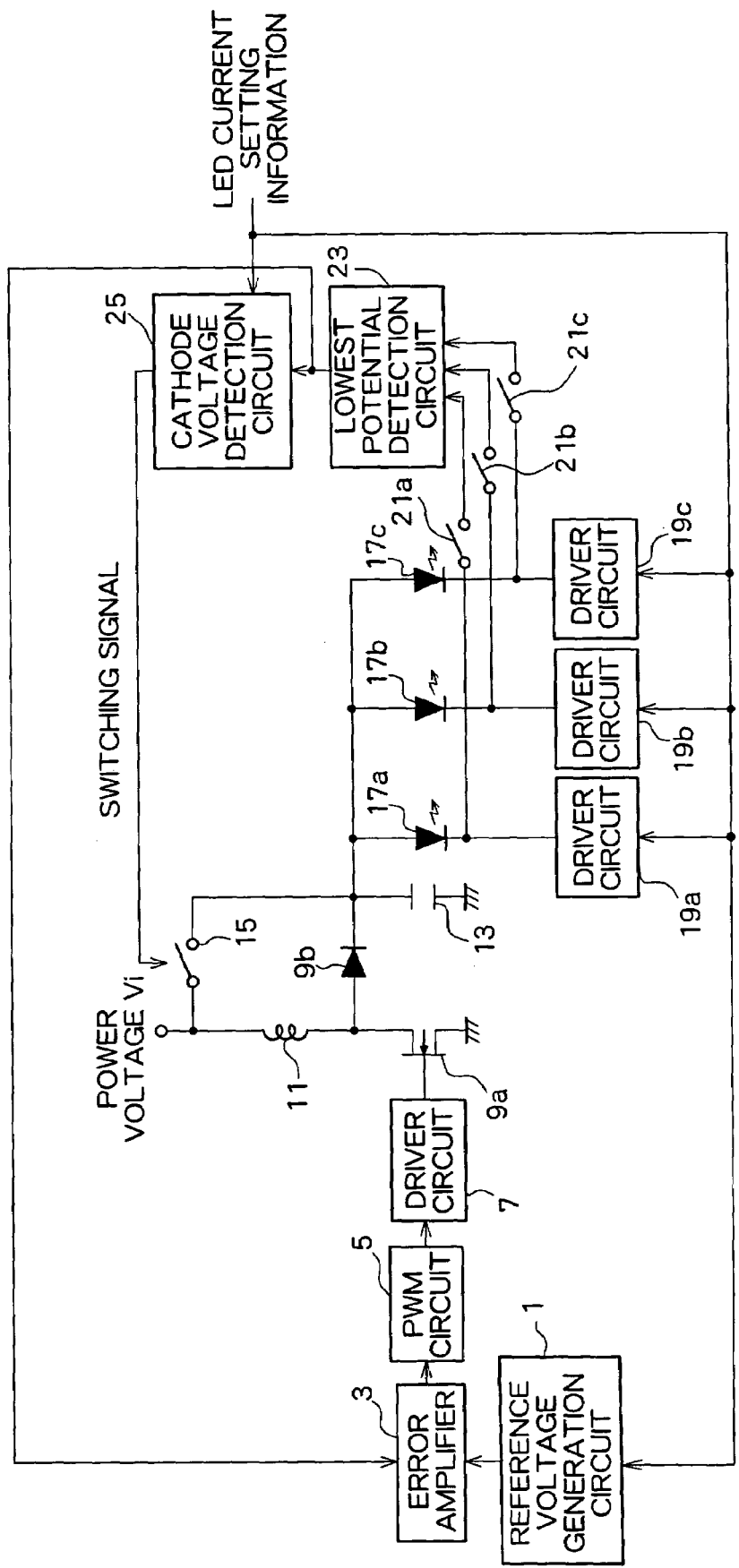
FIG. 8 is a diagram showing the step-up switching voltage regulator circuit according to a fourth embodiment of the present invention.
Figure 9:
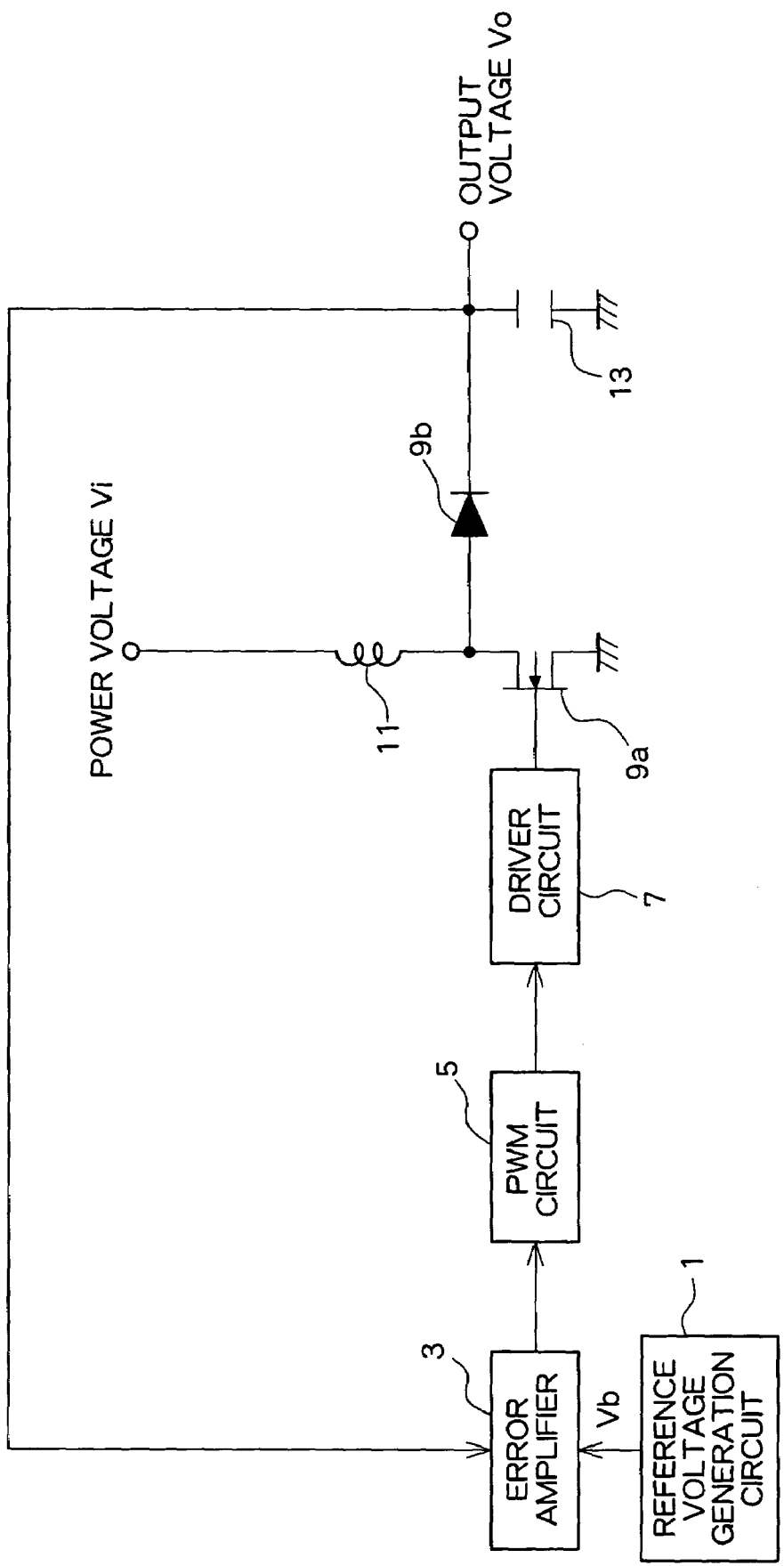
FIG. 9 is a diagram showing a conventional step-up switching voltage regulator circuit.
Figure 10:
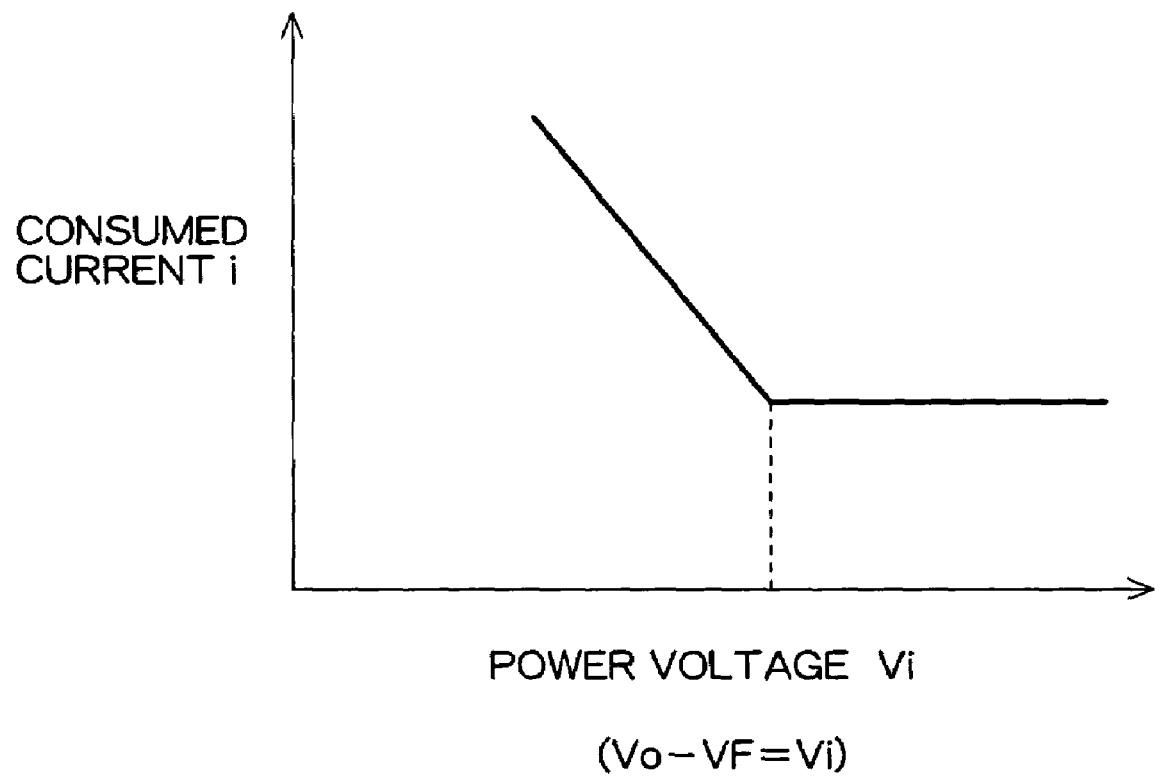
FIG. 10 is a diagram showing a relation between a power voltage and a charged voltage in the conventional step-up switching voltage regulator circuit.

As described above, forward-direction voltages may be applied to light emitting diodes 17a, 17b, 17c in accordance with a current quantity. Therefore, when a predetermined output voltage Vo (anode voltage of the light emitting diode) is changed in accordance with the quantity of the current flowing through the light emitting diode, a power voltage Vi is not unnecessarily raised, and a burden on a battery can further be reduced. FIG. 8 shows a step-up switching voltage regulator circuit according to a fourth embodiment. As shown in FIG. 8, in a reference voltage generation circuit 1, a reference voltage Vb is changed in accordance with current setting information of driver circuits 19a, 19b, 19c. Accordingly, a predetermined output voltage Vo (anode voltage of the light emitting diode) can be changed in accordance with quantities of currents flowing through the light emitting diodes 17a, 17b, 17c. Therefore, the power voltage Vi is not unnecessarily raised, and the burden on the battery can further be reduced.

As described above, the step-up switching voltage regulator circuit according to the fourth embodiment is constituted to change the predetermined output voltage in accordance with the current quantity of the light emitting diode. Consequently, it is possible to realize the step-up switching voltage regulator circuit having less power consumption. In the present embodiment, the chopper type step-up switching voltage regulator circuit has been described, but, needless to say, similar effects are obtained even from the synchronous rectifier type as in the first embodiment.

It is apparent that the present invention is not limited to the above embodiments but may be changed and modified without departing from the scope and spirit of the invention.

What is claimed is:

1. A step-up switching voltage regulator circuit which outputs as an output voltage a voltage obtained by raising a power voltage supplied from a battery, comprising:

a switch which switches an output in such a manner as to output the power voltage supplied from the battery as the output voltage when the power voltage supplied from the battery is larger than a predetermined output voltage, and in such a manner as to raise the power voltage supplied from the battery to the predetermined output voltage and to output the raised voltage as the output voltage when the power voltage supplied from the battery is smaller than the predetermined output voltage, wherein a light emitting diode is driven by the output voltage, and the output is switched based on a cathode voltage of the light emitting diode; and a plurality of light emitting diodes which are driven by the output voltage, wherein the output is switched based on the lowest cathode voltage among the cathode voltages of the plurality of light emitting diodes.

2. A step-up switching voltage regulator circuit which outputs as an output voltage a voltage obtained by raising a power voltage supplied from a battery, comprising:

a switch which switches an output in such a manner as to output the power voltage supplied from the battery as the output voltage when the power voltage supplied from the battery is larger than a predetermined output voltage, and in such a manner as to raise the power voltage supplied from the battery to the predetermined output voltage and to output the raised voltage as the output voltage when the power voltage supplied from the battery is smaller than the predetermined output voltage, wherein a light emitting diode is driven by the output voltage, and the output is switched based on a cathode voltage of the light emitting diode; and a plurality of light emitting diodes which are driven by the output voltage, wherein the output is switched based on the lowest cathode voltage among the cathode voltages of the plurality of light emitting diodes, and wherein a value of the cathode voltage to switch the output is changed in accordance with a current quantity of the light emitting diode.

3. A step-up switching voltage regulator circuit comprising:

a switch which switches an output in such a manner as to output a supplied voltage as an output voltage when the supplied voltage is larger than a predetermined output voltage, and in such a manner as to raise the supplied voltage to the predetermined output voltage and to output the raised voltage as the output voltage when the supplied voltage is smaller than the predetermined output voltage, wherein a light emitting diode is driven by the output voltage, and the output is switched based on a cathode voltage of the light emitting diode; and a plurality of light emitting diodes which are driven by the output voltage, wherein the output is switched based on the lowest cathode voltage among the cathode voltages of the plurality of light emitting diodes.

4. The step-up switching voltage regulator circuit according to claim 3, wherein a value of the cathode voltage to switch the output is changed in accordance with a current quantity of the light emitting diode.

* * * * *